C. W. BROWN.
Soft Rubber-Cutter.
No. 28,345. Patented May 22, 1860.
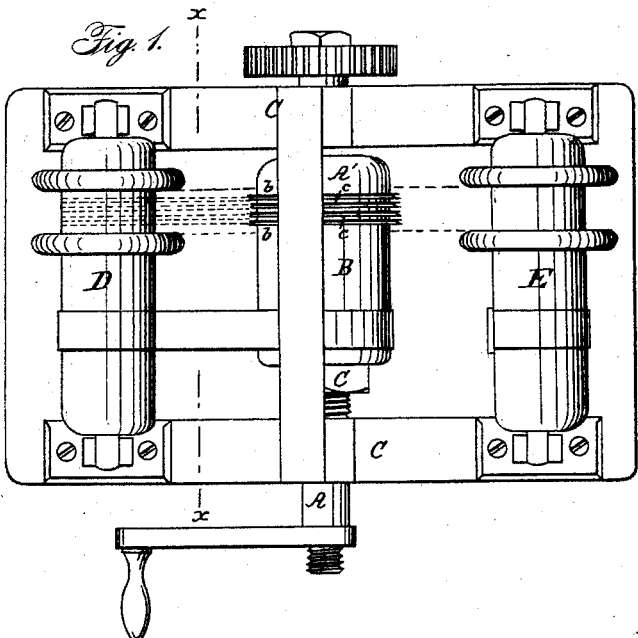
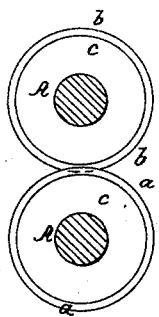
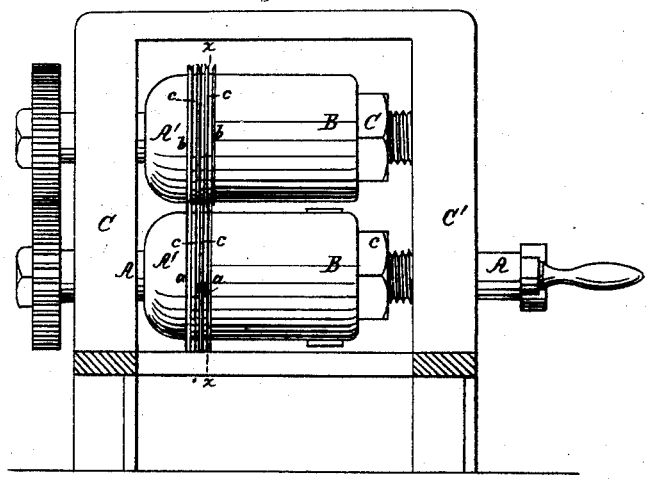
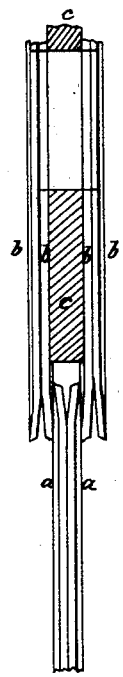
Witnesses:
Inventor:

UNITED STATES PATENT OFFICE.

CHARLES W. BROWN, OF BOSTON, MASSACHUSETTS.

ROTARY CUTTING-SHEARS.

Specification of Letters Patent No. 28,345, dated May 22, 1860.

*To all whom it may concern:*

Be it known that I, CHARLES W. BROWN, of Boston, in the county of Suffolk and State of Massachusetts, have invented a new and useful Improvement in Rotary Cutting-Shears; and I do hereby declare that the following is a full, clear, and exact description thereof, reference being had to the accompanying drawings, forming a part of this specification, in which—

Figure 1 represents a plan view of the machine, of which the rotary shears form a part. Fig. 2, is one end elevation, showing the shears hung in bearings in the frame of the machine, arranged in their proper relation to each series. Fig. 3, is an enlarged view of a section of the shear plates showing clearly their form and arrangement on the driving shafts. Fig. 4, is a detached end sectional view of two cutters, and the rings that are interposed between them.

Similar letters of reference indicate corresponding parts in the four figures.

This invention has for its object the cutting or shearing of india-rubber cloth into narrow strips by a new and improved system of rotary shears, which are constructed and arranged upon suitable shafts in such a manner that they will be brought in contact only at their cutting edges, or so that the points of contact of the shears will be the cutting points. The objection to the present shears for stripping rubber is that they spread apart and allow the rubber, it being of a very peculiar elastic and cohesive nature, to get between two shear plates, which separates their cutting edges and prevents them from cutting, the rubber strips are in this manner torn asunder, the belt of rubber is thrown out of a straight course, and the machine is rendered inoperative, and so far as effecting the work rapidly, such machinery is totally impracticable.

My inventions consists in the employment of any suitable number of circular concavo-convex plates of steel, arranged in pairs on suitable shafts in a manner hereinafter described, one series or gang of plates being arranged in such a relation to the other that the outer cutting edges of one series of plates will be brought into contact with the outer cutting edges of the other series of plates, and so that the points of intersection or contact of each set of cutters, will be cutting points, whereas, in the present mode of arranging and bringing together circular plates for stripping rubber, both their edges and surfaces, and brought into contact, and the consequence is that the rubber frequently becomes wedged between their cutting edges, and destroys the proper action of plates. My invention provides for keeping the cutting edges of each pair of plates on one shaft, always in perfect contact with the cutting edges of each pair of plates on the opposite shaft, and so as, by their elasticity, to correct any variations in their thickness, resulting from imperfect workmanship or other causes, as will be hereinafter described and represented.

To enable those skilled in the art to fully understand my invention, I will proceed to describe its construction and operation.

In order to illustrate the operation of my invention perfectly I have represented in the drawings the machine of which my invention forms the essential feature, showing the manner of keeping the work under constant tension, and at the same time conducting it to and from the cutters as fast as they perform their work.

In said drawings *a, a, b, b*, represent circular plates of steel which are properly wrought out and swaged into a concave convex form as clearly shown in the enlarged sectional view (Fig. 3) having their edges or periphery beveled, as will be hereinafter shown, and a circular hole punched through their centers. These plates are now placed on a shaft or arbor A, in the following order, two plates *a, a,* are placed together with their convex sides touching and run on the shaft A, up against a fixed collar A', the diameter of which is less than that of the plates *a, a,* then a narrow metal ring *c*, of the same diameter as the collar A', is put on the shaft and brought up against the first two plates, then two more plates *a, a,* are placed on the shaft A, followed by another ring *b*, and in this way a cylinder of any desirable length may be formed of alternating spaces and pairs of circular plates, when the entire gang should be confined by a loose collar B, and nut C, in the manner of confining a circular saw to an arbor. Two such cylinders of cutters are brought together and arranged in a suitable frame C', so that the outer edges of each pair of cutters of one arbor will intersect with the cutting edges of each pair of plates on the other arbor as shown in the drawings, Figs. 2, 3 and 4. Now to keep the cutting edges of these circular shear plates always in contact, they are each made concavo-convex, and by putting them together in pairs as above described with circular rings interposed between each pair, and confining the whole firmly together, the distances between the circumferential cutting edges of each pair of plates, will be less than the thickness of the rings that are interposed between each pair, in consequence of the described shape given to the plates before they are locked up or clamped together. Each pair of circular plates of one shaft are interposed between the pairs of plates on the other shaft, and thus it will be observed that the flaring edges of all the plates of both shafts are brought into close contact and kept in contact when the cutting takes place by virtue of their respective (laterally) elastic action. This laterally yielding elasticity resulting from the novel form given to the plates and their arrangement in gangs constitutes the essential feature of my invention, and without such, the shearing of rubber into strips can not be properly done, for with plates arranged so as to operate in the present manner, the elasticity that is desirable in my case renders those inefficient on account of the rubber getting between the plates wedging itself tightly therein and destroying the contact of the cutting edges. This difficulty can not take place with my cutting plates, as the tendency of each cutter, and its action upon the rubber cloth is to cut and clear itself, the cutting edges only touching, and the spaces behind the cutting edges between each pair of plates being wider than the strips when cut.

The work to be submitted to the operation of the cutters is wound up on a flanged roller D, passed between the two series of cutters and wound up by a roller E, that keeps the strips under constant tension sufficient to draw the same from between the pairs of cutters, while the work is being performed.

I do not claim the two series of circular or annular plates, intersecting at the edges, as an original invention, a similar arrangement having been previously used in cutting india-rubber; but—

Having thus described my invention, what I claim as new and desire to secure by Letters Patent, is—

The annular shear plates when formed and arranged essentially as and for the purposes described so that their cutting edges will always be kept in perfect contact and so as by their elasticity to correct any variations in their thickness, resulting from imperfect workmanship or other causes.

CHARLES W. BROWN.

Witnesses:
J. D. MORTON,
GEO. O. CARPENTER.